Feb. 10, 1953 R. E. SLATER 2,628,041
FISHING REEL
Filed Jan. 14, 1950 2 SHEETS—SHEET 2

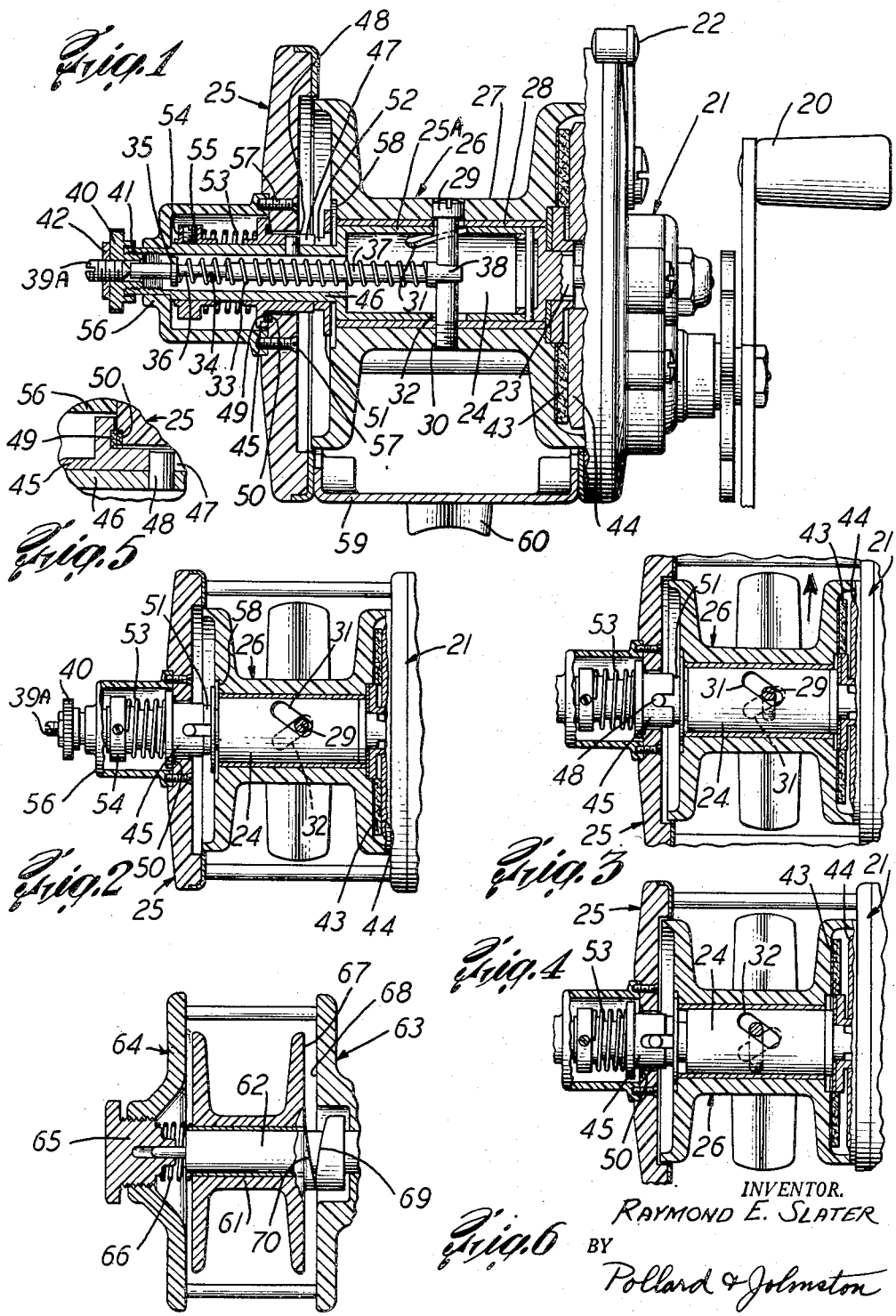

INVENTOR.
RAYMOND E. SLATER
BY
Pollard & Johnston
ATTORNEYS

Patented Feb. 10, 1953

2,628,041

UNITED STATES PATENT OFFICE 2,628,041

FISHING REEL

Raymond E. Slater, New Rochelle, N. Y., assignor of one-half to W. J. Warburton Associates, Inc., New York, N. Y., a corporation of New York Application January 14, 1950, Serial No. 138,607

13 Claims. (Cl. 242—84.5)

This invention relates to fishing reels and particularly to a fishing reel arranged so that there will be substantially no backlash when the fishing reel is used for casting purposes, especially when the spool is allowed to rotate freely when casting.

In previous reels, difficulty has been encountered in preventing backlash. Backlash occurs when a lure or bait is cast using a fishing rod with a reel thereon, and the line is stopped or materially retarded, causing the spool to overrun the line and thus result in a backlash or a snarl. The material retarding or lowering of the velocity of the line and lure in flight below the velocity of the line as it leaves the rotating spool can be caused for various reasons; for example, wind resistance. The inertia of the rotating parts is such as to cause the overrunning, because of the energy built up in line on spool. It is desirable during the period when the line is rapidly running out, that the spool be free and not subjected to braking or retarding force. In other words, the spool should be substantially in a "free spool" condition. Also it is desirable that the torque required to start the parts rotating at the beginning of the cast should be small and that the movement should be uniform, and a minimum of energy be spent to start rotation.

One of the objects of this invention is to provide an improved reel arrangement in which backlash for all practical purposes will be eliminated.

In the preferred aspect of this invention, the spool upon which the line is wound can be rotatably mounted on a shaft and can be movable axially thereon into and out of braking position, the spool normally being pressed against a stationary braking surface when at rest. Upon start of the cast, the spool is arranged to be moved immediately away from the braking surface so that it becomes substantially a "free spool" device. Upon slowing up of the spool or stopping of the outward movement of the line, the spool is arranged to be moved into contact with the braking surface to prevent backlash, the braking action slowing up the reel to overcome the inertia thereof. A spring or similar arrangement normally holds the spool in contact with a stationary braking surface, the spring acting longitudinally in the direction of the axis of the spool and shaft upon which the spool is rotatably mounted. A cam means of some suitable type is arranged between the reel and its shaft and is operable in such manner that as the spool first starts to turn relative to the shaft, the spool will be moved axially away from the braking surface so that the line can freely run out.

In a further aspect of the preferred form of the invention, means can be provided to temporarily hold the shaft from rotation as the spool first starts to turn so as to reduce the torque necessary to move the spool longitudinally away from the braking surface as will be explained hereafter. Suitable adjusting means can be provided for the various springs involved or tension producing medium used in conjunction with the spool and brake arrangements for the shaft.

Preferably, the spool itself is made light relative to the shaft and other parts so that its inertia is as small as possible and thus can be changed from a static to dynamic state with a minimum of torque. The static condition of the spool is changed to a rotating condition before the other parts move in a short interval before the other parts, including the shaft, start to rotate. By such an arrangement, the energy of the spool will serve to assist in the starting of movement of the other parts and overcoming of inertia of the shaft parts. This will tend to give a smooth action in the progressive movement at starting of the combination by an accelerated delivery of the line as compared to an operation wherein a reel and its associated shaft and parts are started unitarily from rest. All spool parts revolve as a unit when the line is in flight.

In a still further aspect of the invention, when it is used in conjunction with a reel arrangement having winding means disconnectable from the spool so that the spool can rotate freely relative thereto, arrangements can be made so that the aforementioned means for holding the shaft at starting can be disabled, thus, providing an entirely free spool organization for use when casting is not involved. These and other objects, advantages and features of the invention will become apparent from the following description and drawings which are merely exemplary:

Figure 1 is a view partially in section of one form of the invention.

Figure 2 is a fragmentary view partially in section, the drum portion of the shaft not being cut, showing the parts when stationary.

Figure 3 is similar to Figure 2 except that the spool has just started to rotate and to move away from the brake but the shaft brake is still engaged.

Figure 4 is similar to Figure 3 with the exception that the spool has moved far enough to release the shaft brake.

Figure 5 is a fragmentary enlarged view of the shaft braking collar.

Figure 6 is a fragmentary view of another form of the invention.

Figure 7:
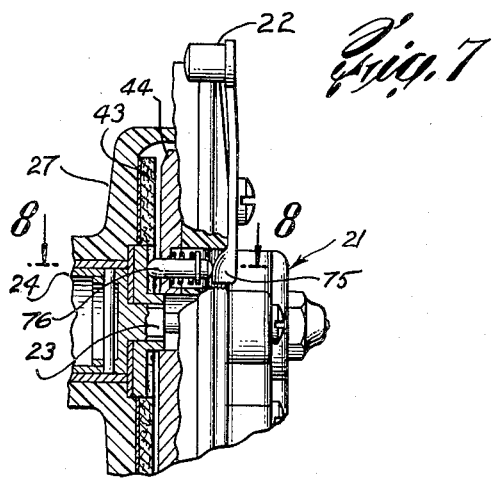
Figure 7 is a fragmentary sectional view of the reel end containing the gears in conjunction with one means for disengaging the spool from the brake.

One form of the invention is illustrated in Figure 1 in conjunction with a reel having a handle 20, said handle being connected to a gear train located in side plate 21. Lever 22 is employed to connect and disconnect the gear train in plate 21 with the shaft stub 23, said shaft stub being connected to or integral with shaft 24, It is to be understood that various types of gear arrangements and connectors can be employed.

Shaft 24 is suitably journaled in side plate 21 and side plate 25. Spool assembly 26 may be composed of the spool 27 made of a suitable plastic, said spool having a bushing 28, bushing 28 rotatably fitting the enlarged drum portion 25A of shaft 24. The spool is rotatable relative to the shaft 24.

A screw 29 is screw-threadedly engaged at 30, with the spool assembly, said screw pressing through shaft 24, cam slots 31 and 32 being cut in the shaft drum 25A for the purpose which will be described hereafter.

Main spring 33 is mounted on spring guide assembly 34, said guide being composed of guide 36 telescopically slidable relative to guide 37. Guide 37 can have a yoke 38 detachably connectable with the shank of screw 29. Collar 35 can serve as an abutment for one end of spring 33, the other abutting a portion of yoke 38. Adjusting means can be provided for the spring and shaft by a movable screw arrangement 39A screw-threadedly engaged in sleeve 40. Sleeve 40 is screw-threadedly engaged at 41 with the internal end of shaft 24.

It can be seen that upon movement of screw 39A and/or sleeve 41, that longitudinal or axial adjustment of the spring can be obtained. A lock nut 42 of any suitable description may be used to lock the main spring adjusting means in any desired position.

Main spring 33 exerts an axial force on spool 26, which will cause spool 26 to be moved to the right (Fig. 1), so that braking surface 43 carried by the spool will engage stationary braking surface 44 carried by side plate 21.

As will be explained hereafter, when the spool starts to move at the start of casting, or upon the accelerated delivery as the line initially runs out, the spool will first turn relative to shaft 24. Assuming that the line is running from the top of the reel in Figure 1, and into or below the plane of the paper, cam slots 31 and 32 are arranged so as to cause spool 26 to move to the left against the force of spring 33, such pressure being exerted axially relative to the spool and shaft. The shaft itself will substantially and immediately thereafter start rotating with the spool so that the assembly is, in effect, a "free spool" assembly. If the outgoing velocity of the line drops to some particular minimum velocity, or if the line is stopped, spring 33 will move the reel to the right (Fig. 1) and into engagement with the braking surface 44, thus preventing backlash.

In a preferred aspect of the invention, a means is provided to temporarily hold shaft 24 from rotation at the beginning of the cast so as to reduce the torque necessary to move the spool into "free spool" or unbraked condition. Shaft braking collar 45 is longitudinally or axially slidably mounted on shaft extension 46 (Figs. 1 and 5), said braking collar having a slot 47 therein, the sides of said slot being engageable with pin 48 keyed to the shaft. A ring 49 of braking material, such as cork or the like, can be provided on the braking collar or in a recess thereof, said braking ring being engageable with a ring 50 of braking material set in the side plate 25. Slidable collar 51 also is mounted on shaft extension 46, said collar being engageable with the end of the braking collar 45. The slidable intermediate collar 51 also has a slot 52 enabling it to straddle pin 48.

Auxiliary spring 53 abuts braking collar 45 at one end and the adjustable sleeve or abutment 54 at its other end, said sleeve 54 being held in place by set screw 55 engaging extension 46 of shaft 24.

The spring characteristics, such as length and constant, should be chosen to give the desired results. In some instances, the auxiliary spring can be omitted, but this is not preferred. Also, the springs can take various forms.

A suitable covering element 56 can be held on side plate 55 by means of screws 57. It is to be understood that various means can be employed to hold the auxiliary spring and collar in position on the side plate than that specifically illustrated and that the shaft braking collar may be omitted.

Auxiliary spring 53 normally holds braking collar 45 in contact with side plate 25. Inasmuch as the braking collar 45 is connected to the shaft, the braking collar will tend to hold the shaft stationary relative to the side collar when brake surfaces 49 and 50 are in contact. When the spool 26 is moved sufficiently far to the left (Fig. 1), end surface 58 of the spool will contact slidable collar 51 which in turn will move brake collar 45 to the left and out of engagement with the side plate so that there is no braking force exerted upon the shaft. Side plates 21 and 25 can be mounted on reel frame 59 having conventional holding projections 60 and there fastening the assembly to the fishing rod.

The operation of the reel will now be described, reference being made particularly to Figures 2, 3, and 4. In Figure 2, the reel is illustrated when in its stopped position with the spool moved to the right relative to the shaft and side plates so that brake surface 43 thereof is in engagement with brake surface 44 of side plate 21, the main spring 33 urging the spool through screw 29 into such a position. It is to be noted that screw 29 is not at the end of the cam slot 31 when the spool is in braked position. This will permit suitable adjustment of the parts.

Braking collar 45 has its braking surface engaged with the brake surface of side plate 25, auxiliary spring 53 urging the braking collar 45 in such a position. There is a space between the right hand face of collar 51 and the surface 58 of the spool. As the line starts to move from the top of the spool in the direction indicated by the arrow of Figure 3, spool 26 will start to turn relative to shaft 24, shaft 24 in the preferred form being held from rotating by braking collar 45. It is to be noted that in such a position, the spool 26 has moved axially to the left (Fig. 3) relative to the shaft so as to disengage brake surface 43 from brake surface 44. The movement is such that sliding collar 51 does not engage braking collar 45 until after the braking surface 43 and 44 have become disengaged, pin 48 connecting braking collar 45 to shaft 24. Further movement of the spool 26 to the left, as in Figure 4, will cause the braking collar 45 to be moved to the left, auxiliary spring 53 being compressed so as to disengage the braking surface of collar 45 from surface 50 of side plate 25. It is seen that the first movement of parts involves rotation of the relatively light spool itself until it is disengaged from its braking surface. Thereafter, the shaft which has been temporarily held, is disengaged, so that the shaft rotates with the spool.

As previously mentioned, when the line slackens, or is stopped, longitudinal or axial force of the main spring 33 will cause movement of the spool to the right into engagement with the braking surface on the reel frame.

A further modification is illustrated in Figure 6 wherein spool 61 is rotatably mounted on shaft 62, shaft 62 in turn being carried by side plates 63 and 64 of the reel frame. Shaft 62 is suitably journaled in the side plates and can have an adjusting screw 65 mounted in side plate 64. Spring 66 normally urges the spool to the right (Fig. 6) so that braking surface 67 of the spool is in contact with the brake surface 68 of the side plate. Cam 69 is located on the shaft and acts in conjunction with a cam 70 on the end of the spool, upon relative movement of the shaft and spool to cause axial movement of the spool. As the spool starts to move at the beginning of the casting operation, the cam surface 70 will rotate relative to cam surface 69 on the shaft so as to compress spring 64 and move the spool to the left and away from its braking surface.

Figure 8:
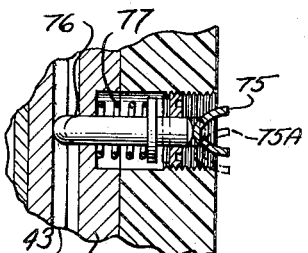
Figure 8 is a fragmentary section along the line 8—8 of Figure 6.

Still a further modification which can be used in conjunction with the form used in Figure 1 is illustrated in Figures 7 and 8 whereby the spool can be disengaged from the braking surface without being connected with the winding mechanism. It is to be understood that the form illustrated in Figure 6 may have a winding mechanism similar to that of Figure 1 connected therewith.

In Figures 7 and 8, the parts which are the same as in Figures 1-3 are given the same reference numbers. The spool 27 is mounted on shaft drum 25 and side plate 21 has lever 22. The gear train in the side plate is connectable to stub shaft 23 of shaft 24 when the lever 22 is moved to winding position. In this aspect of the invention, lever 22 may also have a cam surface 75 illustrated in Figures 7 and 8 engageable with a pin 76 to move the spool to the left so as to disengage the brake without connecting the winding mechanism with the shaft and spool. Spring 77 acts on the collar on pin 76 to urge the pin to the right so as to permit the spool braking surfaces 43 and 44 to be engaged when the parts are at rest and the pin is not engaged by the cam surface 75. The dotted lines in Figure 8 show the pin to the right when the cam 75 is at position 75a which position, or equivalent, it can take when the lever 22 is in the winding position or when it is in the casting position.

It should be apparent that various arrangements can be provided according to the particular design of the winding mechanism for moving the spool out of braking engagement with the braking surfaces on the side plate or reel frame. Also, various materials can be used for the spool, and various types of braking surface and types of braking mechanisms can be used to serve the desired purpose. It is to be understood that variations may be made in the details of construction without departing from the spirit of the invention except as defined in the appended claims.

What is claimed is:

1. In a fishing reel, the combination including a frame, a shaft rotatably mounted on said frame, a spool rotatably mounted on said shaft, an axially acting main spring urging said spool into braking relationship with said frame, cam connections between said spool and shaft moving said spool away from braking engagement with said frame upon relative movement of said shaft and spool, shaft braking means between said shaft and frame, and means disengaging said shaft brake after said spool has been disengaged from its brake.

2. In a fishing reel, the combination including a frame, a shaft rotatably mounted on said frame, a spool rotatably mounted on said shaft, an axially acting main spring urging said spool into braking relationship with said frame, cam connections between said spool and shaft moving said spool away from braking engagement with said frame upon relative movement of said shaft and spool, shaft braking means between said shaft and frame, and means operated by axial movement of said spool disengaging said shaft brake.

3. In a fishing reel, the combination including a frame, a shaft rotatably mounted on said frame, a spool rotatably mounted on said shaft, an axially acting main spring urging said spool into braking relationship with said frame, cam connections between said spool and shaft moving said spool away from braking engagement with said frame upon relative movement of said shaft and spool, disengageable shaft braking means between shaft and frame, auxiliary spring means normally urging said shaft braking means into engagement with said frame, and means operated by axial movement of said spool overcoming said auxiliary spring means and disengaging the shaft brake.

4. In a fishing reel, the combination including a frame having side plates, a shaft rotatably mounted on said side plates, said shaft having a hollow portion, a spool rotatably mounted on said shaft, a brake surface on one of said side plates engageable with said spool, cam slot means in said shaft, a pin means engageable in said slot means and connected to said spool, said cam slot and pin moving said spool axially upon rotation of said spool relative to said shaft, and an axial main spring connected with said pin means and urging said spool axially into braking engagement with said brake surface on one of said side plates, so that accelerated delivery of line from said spool will cause movement thereof axially against the force of the main spring and away from said brake.

5. In a fishing reel, the combination including a frame having side plates, a shaft rotatably mounted on said side plates, said shaft having a hollow portion, a spool rotatably mounted on said shaft, brake surface means on one of said plates engageable by said spool, cam slot means in said shaft, a pin means engageable in said slot means and connected to said spool, said cam slot and pin axially moving said spool upon said shaft upon relative rotation of the spool on said shaft, an axial main spring in said hollow shaft portion connected with said pin means and urging said spool axially into braking engagement with said brake surface means on one of said side plates, so that accelerated delivery of line from said spool will cause movement thereof axially against the force of the main spring and away from said brake, and means restraining rotation of said shaft until said spool has started to rotate and has moved away from contact with its braking surface.

6. In a fishing reel, the combination including a frame having side plates, a shaft rotatably mounted on said side plates, said shaft having a hollow portion, a spool rotatably mounted on said shaft, brake surface means on one of said side plates, cam slot means in said shaft, a pin means engageable in said slot means and connected to said spool, said cam slot and pin axially moving said spool upon said shaft upon relative rotation of the spool on said shaft, an axial main spring connected with said pin means and urging said spool axially into braking engagement with said brake surface means on one of said side plates, so that accelerated delivery of line from said spool will cause movement thereof axially against the force of the main spring and away from said brake surface means, spring pressed shaft brake means axially slidable relative to a side plate and when in contact therewith restraining rotation of said shaft, and means connecting said spool with said shaft brake after said spool has moved away from its brake to move said shaft brake means and disable said shaft brake.

7. In a fishing reel, the combination including a frame having side plates, a shaft rotatably mounted on said side plates, one of said side plates having a brake surface, said shaft having a hollow portion, a spool rotatably mounted on said shaft, cam slot means in said shaft, a pin means engageable in said slot means and connected to said spool, said cam slot and pin axially moving said spool upon said shaft upon relative rotation of the spool on said shaft, an axial main spring mounted on said shaft in said hollow portion and connected with said pin means, said spring urging said spool axially into braking engagement with said brake surface on one of said side plates, so that accelerated delivery of line from said spool will cause movement thereof axially against the force of the main spring and away from said brake surface.

8. In a fishing reel, the combination including a frame having side plates, one of said side plates having a brake surface, a shaft rotatably mounted on said side plates, a spool rotatably mounted on said shaft, cam slot means and engaging means therefor connected said spool and shaft and moving said spool axially relative to said shaft upon relative rotation of said spool and shaft, an axially directed main spring connected to said spool and urging said spool along said shaft into braking engagement with said brake surface on one of said side plates, so that accelerated delivery of line from said spool will cause movement thereof axially against the force of the main spring and away from said brake surface, an adjusting screw means at one end of said spring for adjusting the axially directed force thereof, a shaft brake engageable with a side plate, spring means urging said shaft brake into engagement with said side plate, and means moving said shaft brake out of engagement with said side plate after the spool has axially moved.

9. In a fishing reel, the combination including a frame having side plates, a shaft having a bore therein rotatably mounted on said side plates, a spool rotatably mounted on said shaft, cam slots on opposite sides of said shaft, a pin extending through said slots and held in said spool, said cam slot and pin moving said spool axially relative to said shaft upon relative rotation of said shaft and spool, and an axially located spring in said bore having one end engaging said pin and its opposite end connected with said shaft, said spring normally urging said spool into braking engagement with a side plate, relative movement of said spool and shaft axially moving said spool away from braking engagement with its side plate.

10. In a fishing reel, the combination including a frame having side plates, a shaft having a bore therein rotatably mounted on said side plates, a spool rotatably mounted on said shaft, cam slots on opposite sides of said shaft, a pin extending through said slots and held in said spool, an axially located spring in said bore having one end engaging said pin and its opposite end connected with said shaft, said spring normally urging said spool into braking engagement with a side plate, relative movement of said spool and shaft axially moving said spool away from braking engagement with its side plate, a shaft brake collar axially slidable on said shaft into and out of braking engagement with a side plate, and an auxilliary spring urging said collar into braking engagement with its side plate, said collar being moved out of engagement with its side plate by said axial movement of said spool.

11. In a fishing reel, the combination comprising a frame, a shaft rotatably mounted on said frame, a spool rotatably mounted on said shaft, a spring axially urging said spool into braking engagement with said frame, cam means connecting said spool and shaft operable upon relative movement of said spool and shaft to axially move said spool away from its braking engagement with said frame, winding means selectively connectable with said shaft, mechanical means operable to move said spool axially relative to said shaft, and means operable selectively connecting said winding means with said shaft and operating said mechanical means to move said spool into a free spool position.

12. In a fishing reel, the combination including a frame, a shaft rotatably mounted on said frame, a spool rotatably mounted on said shaft, a brake surface on said frame, a brake means connected to said shaft and movable axially thereon into and out of braking relationship with said brake surface, cam means connecting said spool and shaft moving said spool axially on said shaft into operative contact with said brake means for moving said brake means out of braking relationship with said brake surface upon accelerated delivery of line from the spool, and spring means axially urging said brake means into contact with said brake surface.

13. In a fishing reel, the combination including a frame, a shaft rotatably mounted on said frame, a spool rotatably mounted on said shaft, a brake surface on said frame, a brake means connected to said shaft and movable axially thereon into and out of braking relationship with said brake surface, cam means connecting said spool and shaft moving said spool axially on said shaft into operative contact with said brake means for moving said brake means out of braking relationship with said brake surface upon accelerated delivery of line from the spool, spring means axially urging said brake means into contact with said brake surface, a second brake surface on said frame, and spring means normally urging said spool into braking engagement with said second braking surface.

RAYMOND E. SLATER.

REFERENCES CITED

The following references are of record in the file of this patent:

UNITED STATES PATENTS

| Number | Name | Date |
| --- | --- | --- |
| 1,456,283 | Schmid | May 22, 1923 |
| 1,811,266 | Foss | June 23, 1931 |
| 2,324,324 | Rutledge | July 13, 1943 |
| 2,520,552 | Kilian | Aug. 29, 1950 |